United States Patent
Kato et al.

(10) Patent No.: US 8,281,618 B2
(45) Date of Patent: Oct. 9, 2012

(54) ALKALI-FREE GLASS SUBSTRATE AND PROCESS FOR PRODUCING THE SAME

(75) Inventors: Yoshinari Kato, Otsu (JP); Tatsuya Takaya, Otsu (JP)

(73) Assignee: Nippon Electric Glass Co., Ltd., Otsu-shi, Shiga (JP)

( * ) Notice: Subject to any disclaimer, the term of this patent is extended or adjusted under 35 U.S.C. 154(b) by 433 days.

(21) Appl. No.: 12/097,410

(22) PCT Filed: Dec. 15, 2006

(86) PCT No.: PCT/JP2006/325096
§ 371 (c)(1),
(2), (4) Date: Jun. 13, 2008

(87) PCT Pub. No.: WO2007/069739
PCT Pub. Date: Jun. 21, 2007

(65) Prior Publication Data
US 2009/0170684 A1 Jul. 2, 2009

(30) Foreign Application Priority Data
Dec. 16, 2005 (JP) .............................. P.2005-362642

(51) Int. Cl.
*C03B 17/00* (2006.01)
*C03B 17/06* (2006.01)

(52) U.S. Cl. ...... 65/95; 65/53; 65/90; 65/99.1; 65/29.19
(58) Field of Classification Search ............ 65/114, 65/115, 116, 117, 118, 119, 53, 90, 95, 99.1
See application file for complete search history.

(56) References Cited

U.S. PATENT DOCUMENTS

| | | | | |
|---|---|---|---|---|
| 5,674,304 | A * | 10/1997 | Fukada et al. | 65/32.4 |
| 7,409,839 | B2 * | 8/2008 | Boratav et al. | 65/199 |
| 2002/0038559 | A1 | 4/2002 | Hishinuma et al. | |
| 2006/0242994 | A1 | 11/2006 | Boratav et al. | |

FOREIGN PATENT DOCUMENTS

| | | |
|---|---|---|
| CN | 1604875 A | 4/2005 |
| JP | 05-313111 A | 11/1993 |
| JP | 06-024790 A | 2/1994 |
| JP | 06-247730 A | 9/1994 |
| JP | 07109573 A | 4/1995 |
| JP | 08-151224 A | 6/1996 |
| JP | 10-53425 | 2/1998 |
| JP | 2000-281365 | 10/2000 |

(Continued)

OTHER PUBLICATIONS

Moffatt (Mat. Res. Soc. Symp. Proc, V. 345, (1994) pp. 163-174).*
Chinese Office Action with English Language Translation dated Jan. 31, 2012, issued in Chinese patent application No. 2006800472434.

*Primary Examiner* — Jason L. Lazorcik
(74) *Attorney, Agent, or Firm* — Drinker Biddle & Reath LLP (57) ABSTRACT

The invention provides an alkali-free glass substrate small in the variation of the thermal shrinkage and a process for producing the same. An alkali-free glass substrate of the invention has an absolute value of a thermal shrinkage of 50 ppm or more when the alkali-free glass substrate is heated at a rate of 10° C./min from a room temperature, kept at a holding temperature of 450° C. for 10 hr and then cooled at a rate of 10° C./min.

11 Claims, 3 Drawing Sheets

FOREIGN PATENT DOCUMENTS

| | | |
|---|---|---|
| JP | 2000-335925 | 12/2000 |
| JP | 2001031434 A | 2/2001 |
| JP | 2001031435 A | 2/2001 |
| JP | 2001-151534 | 6/2001 |
| JP | 2001-192217 | 7/2001 |
| JP | 2008184335 A | 8/2008 |
| WO | WO 2004/087597 A1 | 10/2004 |
| WO | WO-2005122116 A1 | 12/2005 |

* cited by examiner

ALKALI-FREE GLASS SUBSTRATE AND PROCESS FOR PRODUCING THE SAME

TECHNICAL FIELD

The invention relates to an alkali-free glass substrate suitable as a substrate of a flat display such as a liquid crystal display and an EL display and as a substrate for various kinds of image sensors such as a charge coupled device (CCD) and a contact image sensor (CIS), a hard disc and a filter.

BACKGROUND ART

So far, as a substrate of a flat display such as a liquid crystal display and an EL display, a glass substrate has been widely used.

In particular, an electronic device such as a thin film transistor type active matrix liquid crystal display (TFT-LCD), being thin in thickness and less in the power consumption, has been used in various applications such as car navigation, a finder of a digital camera, a monitor for a personal computer and a TV.

In order to drive a liquid crystal display, it is necessary to form a driving element typified by a TFT element on a glass substrate. In a process of producing a TFT element, a transparent conductive film, an insulating film, a semiconductor film, a metal film and the like are deposited on a glass substrate. Furthermore, in a photolithography etching process, the glass substrate is subjected to various kinds of heat treatments and chemical treatments. For instance, in a TFT type active matrix liquid crystal display, an insulating film and a transparent conductive film are deposited on a glass substrate. Furthermore, a lot of TFTs (thin film transistor) made of amorphous silicon or polycrystalline silicon are formed on the glass substrate by a photolithography-etching process. In such producing processes, the glass substrate is subjected to a heat treatment at a temperature in the range of 300 to 600° C. as well as a treatment of various chemicals such as hydrochloric acid, sulfuric acid, an alkali solution, hydrofluoric acid and buffered hydrofluoric acid. Accordingly, on a glass substrate for use in a TFT liquid crystal display, following characteristics are demanded.

(1) When an alkali metal oxide is contained in glass, an alkali ion diffuses in a deposited semiconductor material during the heat treatment to deteriorate the characteristics of a film; accordingly, an alkali metal oxide is substantially not contained.

(2) The resistance to a solution of acid, alkali and the like used in the photolithography-etching process, that is, the chemical resistance is excellent.

(3) In the steps of deposition, annealing and the like, the glass substrate is exposed to a high temperature. At that time, the thermal shrinkage of the glass substrate is desired small. That is, this is because, when the thermal shrinkage is large, a pattern deviation of a circuit formed on the substrate is caused. From the viewpoint of making the thermal shrinkage smaller, the strain point of glass is advantageously higher.

Furthermore, for a glass substrate for a TFT liquid crystal display, the following characteristics are demanded other than the above.

(4) From the viewpoint of generating no foreign matter in the glass in the steps of melting or forming glass, the devitrification resistance is necessary to be excellent. In particular, when glass is formed in accordance with a down draw method such as an overflow down draw method, the devitrification resistance of glass is important. When a glass forming temperature is taken into consideration, a liquidus temperature is demanded to be 1200° C. or less.

(5) The density is desired low to make a liquid crystal display lighter in weight. In particular, a glass substrate that is mounted on a note-type personal computer is strongly demanded to be light in weight, specifically, to be 2.50 $g/cm^3$ or less.

(6) The flatness of a surface is necessarily high. For instance, in a liquid crystal display, a liquid crystal layer interposed between two thin glass substrates works as an optical shutter and the layer shields or transmits light to execute display. The liquid crystal layer is maintained to have a very thin thickness such as several to several tens micrometers. Accordingly, the flatness of a surface of the glass substrate, in particular, the unevenness of micrometer level called as undulation tends to affect on a thickness of the liquid crystal layer (called as a cell gap). That is, when the undulation of a surface is large, the display defect such as the display unevenness is caused.

(7) The undulation of a glass substrate is necessarily small. Recently, in a liquid crystal display, for the purpose of high-speed response and high precision, a cell gap tends to be smaller and smaller; accordingly, it becomes more and more important to reduce the undulation of a surface of the glass substrate used herein. A most effective method for reducing the undulation of a surface of the glass substrate is to precisely polish a surface of a formed glass substrate. However, the method is very high in the production cost of the glass substrate. Accordingly, at present, a forming method such as an overflow down draw method or a float method is used for forming a glass substrate as small as possible in the undulation of a surface, and they are then shipped without polishing or after being slightly polished (touch polishing).

In order to satisfy these characteristics, various kinds of glass substrates have been proposed (such as patent literature 1).

Patent literature 1: JP-A-08-811920

DISCLOSURE OF THE INVENTION

Problems that the Invention is to Solve

The thermal shrinkage of a glass substrate is, as mentioned above, preferably as small as possible. However, in recent years, a technology where, with taking the thermal shrinkage of a glass substrate into consideration, the position of the photomask is compensated during the formation of a circuit, is being adopted. As a result, even in a glass substrate that is not sufficiently small in the thermal shrinkage a problem of the pattern deviation becomes overcome. However, when this technology is adopted, the difference of the thermal shrinkages among the glass substrates is demanded smaller.

The thermal shrinkage of a glass substrate is affected by forming conditions, particularly, the cooling rate of glass. However, it is difficult to maintain the cooling rate always constant in the course of production. Accordingly, it is an actual state that even glass substrates produced around the same time are not necessarily same in the thermal shrinkage.

The invention intends to provide an alkali-free glass substrate small in the variation of the thermal shrinkage, and a process for producing the same.

Means for Solving the Problems

The inventors have found, after various studies, that the faster the cooling rate during glass forming is, the smaller the variation of the thermal shrinkage is, thereby achieving the invention.

Figure 1:
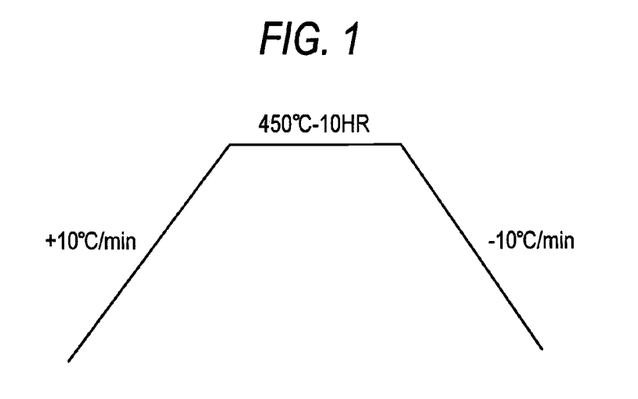
FIG. 1 is an explanatory diagram showing a temperature schedule for obtaining an absolute value of the thermal shrinkage.

That is, an alkali-free glass substrate of the invention has an absolute value of a thermal shrinkage of 50 ppm or more when the alkali-free glass substrate is heated at a rate of 10° C./min from a room temperature, kept at a holding temperature of 450° C. for 10 hr and then cooled at a rate of 10° C./min (subjected to a heat treatment according to a temperature schedule shown in FIG. 1). The "alkali-free glass" in the specification means a glass in which a total amount of alkali metal oxides ($Li_2O$, $Na_2O$ and $K_2O$) is 0.1% or less. Furthermore, the "absolute value of the thermal shrinkage" means a value at a center portion (the proximity of the gravity center) of the substrate.

Another alkali-free glass substrate of the invention has a strain point of 630 to 655° C., and has an absolute value of a thermal shrinkage of 60 ppm or more when the alkali-free glass substrate is heated at a rate of 10° C./min from a room temperature, kept at a holding temperature of 450° C. for 10 hr and then cooled at a rate of 10° C./min (subjected to a heat treatment according to a temperature schedule shown in FIG. 1).

Furthermore, still another alkali-free glass substrate of the invention has a strain point of 655 to 680° C., and has an absolute value of a thermal shrinkage of 50 ppm or more when the alkali-free glass substrate is heated at a rate of 10° C./min from a room temperature, kept at a holding temperature of 450° C. for 10 hr and then cooled at a rate of 10° C./min (subjected to a heat treatment according to a temperature schedule shown in FIG. 1).

A process for producing an alkali-free glass substrate of the invention includes melting and forming a glass raw material, in which, in a cooling step during the forming, an average cooling rate in a temperature range from an annealing temperature to a temperature cooled by 100° C. from the annealing temperature (a temperature range from annealing temperature to (annealing temperature −100° C.)) is 300° C./min or more. The "average cooling rate" means a rate obtained in such a manner that a time during which a center portion in a glass width direction goes past a region in a temperature range from the annealing temperature to a temperature cooled by 100° C. from the annealing temperature (=annealing region) is calculated and a temperature difference (=100° C.) in the annealing region is divided by a time necessary to go past.

Furthermore, another process for producing an alkali-free glass substrate of the invention is a process in which a glass raw material is melted and formed to produce an alkali-free glass having a strain point of 630 to 655° C., and in which, in a cooling step during the forming, an average cooling rate in a temperature range from an annealing temperature to a temperature cooled by 100° C. from the annealing temperature is 350° C./min or more.

Still another process for producing an alkali-free glass substrate of the invention is a process in which a glass raw material is melted and formed to produce an alkali-free glass having a strain point of 655 to 680° C., and in which, in a cooling step during the forming, an average cooling rate in a temperature range from an annealing temperature to a temperature cooled by 100° C. from the annealing temperature is 300° C./min or more.

An alkali-free glass substrate of the invention is produced according to any one of the processes mentioned above.

Advantage of the Invention

A glass substrate of the invention is small in the variation of the thermal shrinkages among substrates. Accordingly, when the position of the photomask is compensated at the time of forming a TFT circuit, since the thermal shrinkage of a glass substrate is always constant, a pattern is stably formed at high yield.

According to the production process of the invention, the foregoing glass substrates can be readily produced. Moreover, when an increase in the cooling rate is carried out by raising a sheet drawing rate, a production amount of glass substrates per unit time can be largely increased. Furthermore, when the sheet drawing rate is raised and simultaneously a flow rate of glass supplied to a forming unit is reduced, glass substrates small in a sheet thickness (specifically 0.6 mm or less, 0.5 mm or less, 0.4 mm or less, in particular 0.3 mm or less) can be produced.

DESCRIPTION OF REFERENCE NUMERALS AND SIGNS

1: Glass sheet sample for obtaining an absolute value of the thermal shrinkage
1a: Half piece (piece of glass sheet to be heat treated) of glass sheet sample for obtaining an absolute value of the thermal shrinkage
1b: Half piece (piece of glass sheet that is not heat treated) of glass sheet sample for obtaining an absolute value of the thermal shrinkage
2: Marking

BEST MODE FOR CARRYING OUT THE INVENTION

In the beginning, a glass substrate of the invention will be described.

Figure 2:
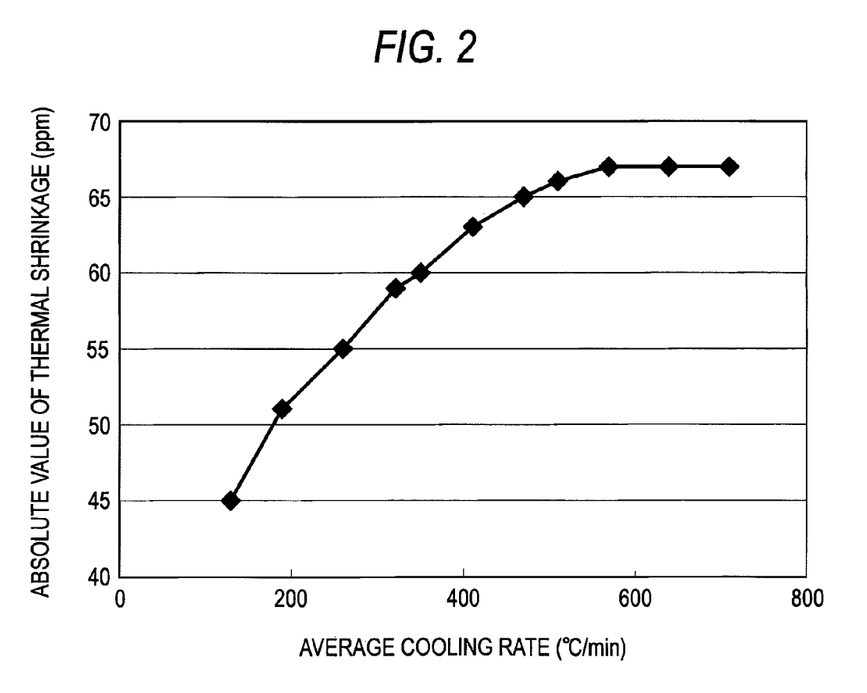
FIG. 2 is a graph showing relationship between an average cooling rate and an absolute value of the thermal shrinkage.

The thermal shrinkage of a glass substrate depends on a cooling rate during sheet glass forming. According to the investigation of the inventors, as shown in FIG. 2, a sheet glass cooled at a higher cooling rate is larger in the thermal shrinkage and conversely a sheet glass cooled at a lower cooling rate is smaller in the thermal shrinkage. On the other hand, in the sheet glass cooled at a higher cooling rate, even when the cooling rate fluctuates a little, the thermal shrinkage hardly fluctuates. Conversely, it is confirmed that the sheet glass cooled at a lower cooling rate largely fluctuates in the thermal shrinkage by a slight variation of the cooling rate.

Specifically, when an absolute value of the thermal shrinkage of an alkali-free glass substrate is 50 ppm or more or preferably 60 ppm or more, the thermal shrinkage hardly varies even when the cooling rate varies. In the case where the pattern deviation due to the thermal shrinkage of the glass substrate is compensated by the position of the photomask, in a temperature range from the annealing temperature to a temperature cooled by 100° C. from the cooling temperature, when a variation of the thermal shrinkage by varying the cooling rate by 60° C./min from the average cooling rate is 3 ppm or less, pattern formation can be carried out stably.

When the absolute values of the thermal shrinkage of the glass substrates are same, there is a tendency that, the higher the strain point of the glass substrate is, the smaller a variation of the thermal shrinkage is. Accordingly, a glass higher in the strain point is more advantageous.

When the strain point is in the range of 630 to 655° C., in order to obtain a glass substrate of which variation mount of the thermal shrinkage when the cooling rate is varied by 60° C./min is 3 ppm or less, the absolute value of the thermal shrinkage of the glass substrate may well be set at 60 ppm or more. In order to set a variation of the thermal shrinkage at 2 ppm or less, the absolute value of the thermal shrinkage of the glass substrate may well be set at 63 ppm or more and, in order to set a variation of the thermal shrinkage at 1 ppm or less, the absolute value of the thermal shrinkage of the glass substrate may well be set at 66 ppm or more. As obvious therefrom, the larger the thermal shrinkage is, the more effective. However, when the absolute value of the thermal shrinkage exceeds 100 ppm, it is difficult to compensate with a photomask. Accordingly, the absolute value of the thermal shrinkage of the glass substrate is preferably set at 100 ppm or less.

Furthermore, when the strain point is in the range of 655 to 680° C., in order to obtain a glass substrate of which variation mount of the thermal shrinkage when the cooling rate is varied by 60° C./min is 3 ppm or less, the absolute value of the thermal shrinkage of the glass substrate may well be set at 50 ppm or more. In order to set a variation of the thermal shrinkage at 2 ppm or less, the absolute value of the thermal shrinkage of the glass substrate may well be set at 53 ppm or more and, in order to set a variation of the thermal shrinkage at 1 ppm or less, the absolute value of the thermal shrinkage of the glass substrate may well be set at 55 ppm or more. Of this kind of glass substrate as well, from the same reason as above, the absolute value of the thermal shrinkage of the glass substrate is preferably set at 100 ppm or less.

As alkali-free glass that constitutes a glass substrate of the invention, various kinds of glasses such as silica glass, borosilicate glass, and aluminosilicate glass may be used, so long as it is suitable for the applications thereof. Among these, those made of glasses that are capable of being formed in accordance with a down draw method, in particular, an overflow down draw method are preferred. That is, in the case of the down draw method, since a cooling region (annealing furnace) in a forming step is extremely short in comparison with that of a float method, an average cooling rate in the temperature range is readily heightened. Accordingly, the thermal shrinkage of glass can be readily heightened. Furthermore, since a glass substrate formed in accordance with an overflow down draw method that is one kind of down draw method is excellent in surface quality, the glass substrate is advantageously used without the need of polishing.

Incidentally, since the glass that is formed in accordance with the down draw method is drawn in a vertical direction, it is affected by the convection. Accordingly, in comparison with a float method where a sheet is drawn in a horizontal direction, the cooling rate is not stabilized, and as the result, the thermal shrinkage tends to fluctuate. Consequently, when the absolute value of the thermal shrinkage is made larger, the stabilization of the thermal shrinkage, which is so far difficult, may be achieved. That is, in the case of glass that is formed in accordance with the down draw method, the invention is very advantageously applied.

Furthermore, in the case of a large-sized glass substrate such as a substrate having a short side of 1500 mm or more, in particular, a short side of 1800 mm or more, the demand for the variation of the thermal shrinkage is more stringent. That is, when a variation of the thermal shrinkage is same, in comparison with a small-sized substrate, a large-sized glass substrate becomes larger in the variation of the dimensional change due to the thermal shrinkage. In this connection, when the absolute value of the thermal shrinkage is set larger, even in a large-sized substrate, the variation of the dimensional change is made smaller. Accordingly, in the case of a large-sized glass substrate, the invention is very advantageously applied.

The glass that is formed in accordance with the down draw method is, for instance, in the case of an overflow down draw method, a glass of which liquidus viscosity is $10^{4.5}$ Pa·s or more and preferably $10^{5.0}$ Pa·s or more. The liquidus viscosity is the viscosity when a crystal precipitates. The higher the liquidus viscosity is, the more difficult the glass devitrifies at the time of glass forming, that is, the production is easy.

As a glass suitable for use in liquid crystal display substrates, an aluminosilicate alkali-free glass containing, by weight %, 50 to 70% of $SiO_2$, 1 to 20% of $Al_2O_3$, 0 to 15% of $B_2O_3$, 0 to 30% of MgO, 0 to 30% of CaO, 0 to 30% of SrO and 0 to 30% of BaO, and preferably containing, by weight %, 50 to 70% of $SiO_2$, 10 to 20% of $Al_2O_3$, 3 to 15% of $B_2O_3$, 0 to 15% of MgO, 0 to 15% of CaO, 0 to 15% of SrO and 0 to 15% of BaO may be mentioned. In this range, a glass substrate that satisfies the required characteristics (1) to (7) mentioned above can be obtained.

In order to obtain a glass having a strain point of 630 to 655° C. in this composition range, a composition may well be appropriately selected in a range of, by weight %, 50 to 65% of $SiO_2$, 10 to 20% of $Al_2O_3$, 5 to 15% of $B_2O_3$, 0 to 5% of MgO, 0 to 10% of CaO, 0 to 10% of SrO and 0 to 15% of BaO, and, preferably, in a range of, by weight %, 50 to 65% of $SiO_2$, 12 to 17% of $Al_2O_3$, 5 to 13% of $B_2O_3$, 0 to 2% of MgO, 3 to 9% of CaO, 4 to 10% of SrO and 0 to 10% of BaO. The reasons why the composition range is thus limited are as shown below.

$SiO_2$ is a component that becomes a network former of glass. A content of $SiO_2$ exceeding 65% is not preferable because the viscosity at high temperatures becomes higher to be poor in the meltability and the devitrification resistance is deteriorated as well. On the other hand, when the content thereof is less than 50%, the chemical resistance is unfavorably deteriorated.

$Al_2O_3$ is a component that raises the strain point. When a content of $Al_2O_3$ is more than 20%, the devitrification resistance and the chemical resistance to buffered hydrofluoric acid are unfavorably deteriorated. When the content thereof is less than 10%, the strain point is unfavorably lowered. A more preferable range thereof is 12% or more and 17% or less.

$B_2O_3$ is a component that works as a flux to improve the meltability of glass. A content of $B_2O_3$ that exceeds 15% is not favorable because the strain point is lowered and the chemical resistance to hydrochloric acid is deteriorated. When the content thereof is less than 5%, the meltability and the devitrification resistance are deteriorated and the chemical resistance to buffered hydrofluoric acid is unfavorably deteriorated as well. A more preferable range thereof is 5% or more and 13% or less.

MgO is a component that lowers the high temperature viscosity to improve the meltability of glass. When a content of MgO is more than 5%, the devitrification resistance and the chemical resistance to buffered hydrofluoric acid are unfavorably deteriorated. A more preferable range thereof is 2% or less. CaO, similarly to MgO, is a component that lowers the high temperature viscosity to improve the meltability of glass. When a content of CaO is more than 10%, the devitrification resistance and the chemical resistance to buffered hydrofluoric acid are unfavorably deteriorated. A more preferable range thereof is 3% or more and 9% or less.

SrO is a component that improves the devitrification resistance and the chemical resistance. A content of SrO more than 10% is unfavorable because the density becomes large and the high temperature viscosity becomes higher to be poor in the meltability. A more preferable range thereof is 4% or more and 10% or less.

BaO as well, similarly to SrO, is a component that improves the devitrification resistance and the chemical resistance. A content of BaO more than 15% is unfavorable because the density becomes large and the high temperature viscosity becomes higher to be poor in the meltability. A more preferable range thereof is 10% or less.

Furthermore, in order to obtain a glass having a strain point of 655 to 680° C., a composition may well be appropriately selected in a range of, by weight %, 50 to 65% of $SiO_2$, 10 to 20% of $Al_2O_3$, 5 to 15% of $B_2O_3$, 0 to 5% of MgO, 0 to 10% of CaO, 0 to 10% of SrO and 0 to 5% of BaO, and, preferably, in a range of, by weight %, 50 to 65% of $SiO_2$, 14 to 19% of $Al_2O_3$, 7 to 15% of $B_2O_3$, 0 to 2% of MgO, 3 to 10% of CaO, 0 to 5% of SrO and 0 to 2% of BaO. The reasons why the composition range is thus limited are as shown below.

$SiO_2$ is a component that becomes a network former of glass. A content of $SiO_2$ exceeding 65% is not preferable because the viscosity at high temperatures becomes higher to be poor in the meltability and the devitrification resistance is deteriorated as well. On the other hand, when the content thereof is less than 50%, the chemical resistance is unfavorably deteriorated.

$Al_2O_3$ is a component that raises the strain point. When a content of $Al_2O_3$ is more than 20%, the devitrification resistance and the chemical resistance to buffered hydrofluoric acid are unfavorably deteriorated. When the content thereof is less than 10%, the strain point is unfavorably lowered. A more preferable range thereof is 14% or more and 19% or less.

$B_2O_3$ is a component that works as a flux to improve the meltability of glass. A content of $B_2O_3$ that exceeds 15% is not favorable because the strain point is lowered and the chemical resistance to hydrochloric acid is deteriorated. When the content thereof is less than 5%, the meltability and the devitrification resistance are deteriorated and the chemical resistance to buffered hydrofluoric acid is unfavorably deteriorated as well. A more preferable range thereof is 7% or more and 15% or less.

MgO is a component that lowers the high temperature viscosity to improve the meltability of glass. When a content of MgO is more than 5%, the devitrification resistance and the chemical resistance to buffered hydrofluoric acid are unfavorably deteriorated. A more preferable range thereof is 2% or less.

CaO, similarly to MgO, is a component that lowers the high temperature viscosity to improve the meltability of glass. When a content of CaO is more than 10%, the devitrification resistance and the chemical resistance to buffered hydrofluoric acid are unfavorably deteriorated. A more preferable range thereof is 3% or more and 10% or less.

SrO is a component that improves the devitrification resistance and the chemical resistance. A content of SrO more than 10% is unfavorable because the density becomes large and the high temperature viscosity becomes higher to be poor in the meltability. A more preferable range thereof is 5% or less.

BaO as well, similarly to SrO, is a component that improves the devitrification resistance and the chemical resistance. A content of BaO more than 5% is unfavorable because the density becomes large and the high temperature viscosity becomes higher to be poor in the meltability. A more preferable range thereof is 2% or less.

In the next place, a production process of the invention will be described.

Glass raw materials blended so as to be a desired composition are melted. At the blending of the glass raw materials, so as to be a glass composition having the characteristics suitable for the application, glass raw materials such as oxides, nitrates and carbonates, cullet and the like may well be measured and blended. Although the kind of glass such as silica glass, borosilicate glass and aluminosilicate glass are not specifically limited, among these, the glass raw materials are preferably blended so as to obtain a glass capable of being formed in accordance with a down draw method, especially in accordance with an overflow down draw method. The glass that is formed in accordance with the down draw method is, in the case of, for instance, an overflow down draw method, a glass of which liquidus viscosity is $10^{4.5}$ Pa·s or more and preferably $10^{5.0}$ Pa·s or more.

As a glass composition suitable for use in a liquid crystal display substrate, an aluminosilicate alkali-free glass composition having a composition in the range of, by weight %, 50 to 70% of $SiO_2$, 1 to 20% of $Al_2O_3$, 0 to 15% of $B_2O_3$, 0 to 30% of MgO, 0 to 30% of CaO, 0 to 30% of SrO and 0 to 30% of BaO and, preferably, in the range of, by weight %, 50 to 70% of $SiO_2$, 10 to 20% of $Al_2O_3$, 3 to 15% of $B_2O_3$, 0 to 15% of MgO, 0 to 15% of CaO, 0 to 15% of SrO and 0 to 15% of BaO may be mentioned as mentioned above. In order to obtain a glass having a strain point in the range of 630 to 655° C. in this composition range, raw materials may well be selected so that a composition may be in a range of, by weight %, 50 to 65% of $SiO_2$, 10 to 20% of $Al_2O_3$, 5 to 15% of $B_2O_3$, 0 to 5% of MgO, 0 to 10% of CaO, 0 to 10% of SrO and 0 to 15% of BaO and, preferably in the range of, by weight %, 50 to 65% of $SiO_2$, 12 to 17% of $Al_2O_3$, 5 to 13% of $B_2O_3$, 0 to 2% of MgO, 3 to 9% of CaO, 4 to 10% of SrO and 0 to 10% of BaO. Furthermore, in order to obtain a glass having a strain point in the range of 655 to 680° C., raw materials may well be selected so that a composition may be in a range of, by weight %, 50 to 65% of $SiO_2$, 10 to 20% of $Al_2O_3$, 5 to 15% of $B_2O_3$, 0 to 5% of MgO, 0 to 10% of CaO, 0 to 10% of SrO and 0 to 5% of BaO and, preferably in the range of, by weight %, 50 to 65% of $SiO_2$, 14 to 19% of $Al_2O_3$, 7 to 15% of $B_2O_3$, 0 to 2% of MgO, 3 to 10% of CaO, 0 to 5% of SrO and 0 to 2% of BaO.

Glass raw materials thus blended are supplied to a glass melting unit to melt. A melting temperature may well be appropriately controlled depending on the kind of the glass. For instance, in the case of the glass having the afore-mentioned composition, the glass raw materials may well be melted at a temperature substantially in the range of 1500 to 1650° C. In the melting step of the invention, various kinds of steps such as fining and stirring are included.

In the next place, a molten glass is formed into a sheet glass, followed by cooling. In order to control the thermal shrinkage characteristics of a glass substrate, a management of a thermal profile in an annealing region where the formed sheet glass is cooled to room temperature is important. Specifically, an average cooling rate in a temperature range from an annealing point to a temperature lowered by 100° C. from the annealing point may well be controlled so as to be 300° C./min or more. When the average cooling rate is controlled so as to be 300° C./min or more, although an absolute value of the thermal shrinkage of the glass substrate becomes larger, the variation of the thermal shrinkage due to fluctuation of producing conditions becomes smaller. For instance, even when the cooling rate in the annealing region is varied by 60°

C./min, a variation of the thermal shrinkage may be controlled so as to be 3 ppm or less, particularly 2 ppm or less, and furthermore 1 ppm or less. As a result, the variation of the thermal shrinkages among the glass substrates becomes difficult to occur. In order to inhibit a generation of inadequate stress in the glass or an application of excessive load on a forming body, the upper limit of the average cooling rate is preferably set at 1000° C./min or less.

In the case where a glass having a strain point of, for instance, 630 to 655° C. is produced, in order to obtain a glass substrate in which a variation of the thermal shrinkage is 3 ppm or less even when the cooling rate is varied by 60° C./min from an average cooling rate, an average cooling rate in a temperature range from an annealing point to a temperature lowered by 100° C. from the annealing point may well be set at 350° C./min or more. An absolute value of the thermal shrinkage of the glass substrate obtained under the conditions becomes substantially 60 ppm or more. In order to obtain a variation of the thermal shrinkage of 2 ppm or less, an average cooling rate may well be set at 410° C./min or more and, in order to obtain a variation of the thermal shrinkage of 1 ppm or less, an average cooling rate may well be set at 510° C./min or more. Absolute values of the thermal shrinkages of the glass substrates obtained under the conditions are substantially 63 ppm or more and substantially 66 ppm or more, respectively.

In the case where a glass having a strain point of 655 to 680° C. is produced, in order to obtain a glass substrate in which a variation of the thermal shrinkage is 3 ppm or less even when the cooling rate is varied by 60° C./min, an average cooling rate in a temperature range from an annealing point to a temperature lowered by 100° C. from the annealing point may well be set at 300° C./min or more. An absolute value of the thermal shrinkage of the glass substrate obtained under the conditions becomes substantially 50 ppm or more. In order to obtain a variation of the thermal shrinkage of 2 ppm or less, an average cooling rate may well be set at 360° C./min or more and, in order to obtain a variation of the thermal shrinkage of 1 ppm or less, an average cooling rate may well be set at 420° C./min or more. Absolute values of the thermal shrinkages of the glass substrates obtained under the conditions are substantially 53 ppm or more and substantially 55 ppm or more, respectively.

As one of methods that are most effective to heighten the average cooling rate, there is a method where a sheet drawing rate of sheet glass is raised. The higher the sheet drawing rate is raised, the larger an absolute value of the thermal shrinkage becomes, whereby the variation of the thermal shrinkage due to fluctuation of the sheet drawing rate is made smaller. In order to raise the sheet drawing rate, a rotational rate of a stretching roller that stretches the formed glass may be raised. Furthermore, when a down draw method where a cooling region (annealing furnace) in the forming process is extremely short in comparison with a float method is adopted, an average cooling rate in the temperature region can be readily heightened. Furthermore, when an overflow down draw method that is one kind of the down draw method is used for forming, a glass substrate excellent in a surface quality may be obtained, resulting in advantageously omitting a polishing process. Specifically, the sheet drawing rate in a temperature range from an annealing point to a temperature lowered by 100° C. from the annealing point is set preferably at 150 cm/min or more, more preferably at 270 cm/min or more, still more preferably at 320 cm/min or more and particularly preferably at 400 cm/min or more. Although there is no particular upper limit in the sheet drawing rate, when a load on a forming unit is considered, the sheet drawing rate is set preferably at 800 cm/min or less.

In an actual production process, the higher the sheet drawing rate is raised, the more difficult maintaining the rate constant is. As a result, the fluctuation of the sheet drawing rate (=cooling rate) becomes larger, whereby the variation of the thermal shrinkage is caused. When the fluctuation due to the sheet drawing rate is not neglected, the rotational rate of the stretching roller or the glass flow rate may well be controlled, for instance, by always observing the fluctuation of the sheet drawing rate, so that the sheet drawing rate may be maintained constant.

When the down draw method is used for forming, since a glass sheet is drawn in a vertical direction, it is affected by the convection. Accordingly, in comparison with a float method where a sheet is drawn in a horizontal direction, the cooling rate tends to fluctuate. In this connection, when the cooling rate of glass is made larger, the stabilization of the thermal shrinkage, which is so far difficult, may be achieved. That is, when the down draw method is adopted, the invention is said very advantageously applied.

Furthermore, in the case of a large-sized glass substrate, for instance, a substrate having a short side of 1500 mm or more, in particular, a short side of 1800 mm or more being produced, the demand for the variation of the thermal shrinkages among substrates is more stringent. That is, when a variation of the thermal shrinkage is same, in comparison with a small-sized substrate, a large-sized glass substrate becomes larger in the variation of the dimensional change due to the thermal shrinkage. In this connection, when the cooling rate of the glass is made sufficiently large, even in a large-sized substrate, the variation of the dimensional change is made smaller. Accordingly, in the case of a large-sized glass substrate being produced, the invention may be very advantageously applied.

Thereafter, the glass formed in a sheet is cut in a predetermined size, followed by subjecting necessary treatments such an end face treatment and washing.

As mentioned above, a glass substrate large in the thermal shrinkage can be obtained.

EXAMPLES

In what follows, the invention will be described with reference to examples.

In the beginning, glass raw materials were blended so that main components may be, by weight %, 60% of $SiO_2$, 15% of $Al_2O_3$, 10% of $B_2O_3$, 5% of CaO, 5% of SrO and 2% of BaO, followed by mixing, further followed by melting at the maximum temperature of 1650° C. by use of a continuous melting furnace. The molten glass was formed into sheet in accordance with an overflow down draw method at various sheet drawing rates. After that, the sheet glass was cut to thereby obtain alkali-free glass substrates having a size of 1500× 1800×0.65 mm. The glass substrate had the characteristics of the strain point of 650° C., the annealing point of 705° C. and the liquidus viscosity of $10^{5.0}$ Pa·s.

The strain point and annealing point were confirmed by a fiber elongation method based on ASTM C336-7. The liquidus viscosity was measured in such a manner that the glass was pulverized, glass powder gone through 30 mesh (mesh opening: 500 μm) and remained on a 50 mesh (mesh opening: 300 μm) was charged in a platinum boat, followed by keeping in a temperature gradient furnace for 24 hr, further followed by measuring a temperature where a crystal precipitate, that is, the liquidus temperature, still further followed by obtaining the high temperature viscosity corresponding to the temperature. The high temperature viscosity was measured by a platinum ball pulling-up method.

Figure 3:
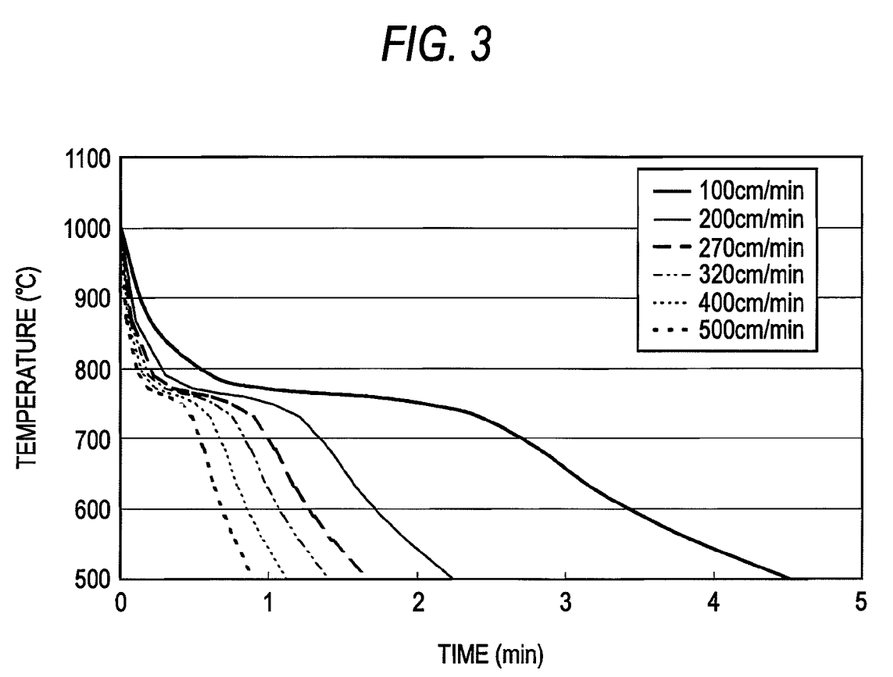
FIG. 3 is a graph showing a thermal profile of glass in a cooling step during forming.

Of the obtained glass substrates, thermal profiles during glass forming when the sheet drawing rate was set at 100 cm/min, 200 cm/min, 270 cm/min, 320 cm/min, 400 cm/min or 500 cm/min is shown in FIG. 3. From FIG. 3, it is found that the faster the sheet drawing rate is, the faster the average cooling rate is. The thermal profile during the glass forming was obtained from a temperature distribution in a sheet drawing direction, which a thermocouple disposed in an annealing region shows, and the sheet drawing rate. The sheet drawing rate means a rate at which a continuously formed glass substrate goes past an annealing region and, in the example, was measured by bringing a measurement roller into contact with an intermediate portion (a position corresponding to annealing temperature −50° C.) in the annealing region. The annealing region means, in a center portion in a sheet width direction, a region corresponding to a temperature range from an annealing point to a temperature lowered by 100° C. from the annealing point, and, in the example, indicates a region where a temperature of a center portion in a sheet width direction becomes from 705° C. to 605° C. Furthermore, the average cooling rate indicates a rate obtained by calculating a time during which a center portion in a width direction of glass goes past the annealing portion, followed by dividing the temperature difference (=100° C.) in the annealing region by the time.

In the next place, of the glass substrates formed at various sheet drawing rates, the average cooling rates and thermal shrinkages when heat treated by a temperature schedule (temperature-up from room temperature at 10° C./min, holding at a holding temperature of 450° C. for 10 hr, and temperature-down at a rate of 10° C./min) of FIG. 1 were obtained and are shown in Table 1. Furthermore, relationship between the average cooling rates and absolute values of the thermal shrinkage at that time are shown in FIG. 2.

TABLE 1

| Sheet Drawing Rate (cm/min) | Cooling Rate (° C./min) 705 to 605° C. | Thermal Shrinkage (ppm) | Δ (ppm) |
|---|---|---|---|
| 100 | 130 | 45 | 6 ppm |
| 150 | 190 | 51 | |
| 200 | 260 | 55 | 4 ppm |
| 250 | 320 | 59 | |
| 270 | 350 | 60 | 3 ppm |
| 320 | 410 | 63 | |
| 320 | 410 | 63 | 2 ppm |
| 370 | 470 | 65 | |
| 400 | 510 | 66 | 1 ppm |
| 450 | 570 | 67 | |
| 500 | 640 | 67 | 0 ppm |
| 550 | 710 | 67 | |

From Table 1 and FIG. 2, it is found that, while an absolute value of the thermal shrinkage becomes larger with an increase in an average cooling rate (=sheet drawing rate), simultaneously a variation of the thermal shrinkage to a variation of the cooling rate becomes smaller.

Figure 4A:
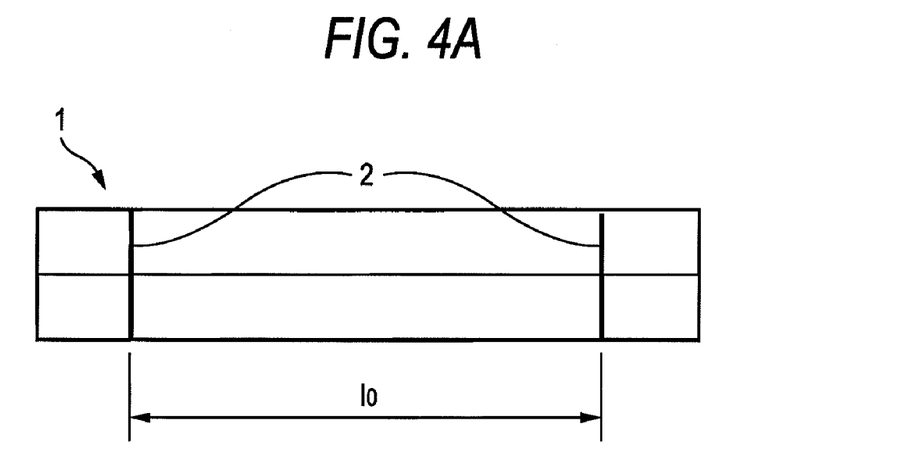
FIGS. 4A and 4B are explanatory diagrams showing a method of measuring an absolute value of the thermal shrinkage.
Figure 4B:
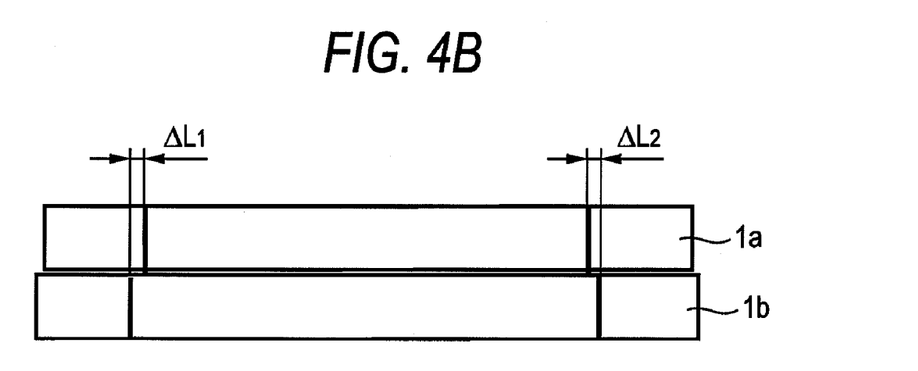

An absolute value of the thermal shrinkage was measured as shown below. In the beginning, a sample of the glass sheet was cut out from a center portion of the obtained glass substrate and, after straight line markings 2 were incised at predetermined positions of a glass sheet 1 as shown in FIG. 4A, the glass sheet 1 was bent vertical to the markings to divide into two glass sheet pieces 1a and 1b. Then, only one glass sheet piece 1a was subjected to a heat treatment according to a temperature schedule shown in FIG. 1 (temperature-up at a rate of 10° C./min from room temperature, holding at a holding temperature of 450° C. for 10 hr, temperature-down at a rate of 10° C./min). Thereafter, as shown in FIG. 4B, the heat-treated glass sheet piece 1a and an un-treated glass sheet piece 1b are arranged and both are adhered by an adhering tape (not shown in the drawing) to fix both, followed by measuring a displacement of the markings 2 by use of a laser microscope, further followed by obtaining a thermal shrinkage by use of a formula 1 below. In the formula 1, $l_0$ indicates a distance between the markings and $\Delta L_1$ and $\Delta L_2$ indicate positional displacements of the markings.

$$S = \frac{\Delta L_1(\mu m) + \Delta L_2(\mu m)}{l_0(mm)} \times 10^3 \text{ (ppm)} \quad \text{Formula 1}$$

The invention claimed is:

1. A process for producing an alkali-free glass substrate comprising melting a glass raw material and forming a glass sheet by an overflow down draw method, wherein, in a cooling step during said forming, an average cooling rate in a temperature range from an annealing point to a temperature lowered by 100° C. from the annealing temperature is 300° C./min or more, and wherein the alkali-free glass substrate has an absolute value of a thermal shrinkage of 50 ppm or more when the alkali-free glass substrate is heated at a rate of 10° C./min from a room temperature, kept at a holding temperature of 450° C. for 10 hours, and then cooled at a rate of 10° C./min, wherein the produced alkali-free glass substrate comprises, by weight %, 50 to 70% of $SiO_2$, 1 to 20% of $Al_2O_3$, 0 to 15% of $B_2O_3$ to 30% of MgO, 0 to 30% of CaO, 0 to 30% of SrO and 0 to 30% of BaO.

2. The process for producing an alkali-free glass substrate according to claim 1, wherein a glass raw material is melted and formed to produce an alkali-free glass substrate having a strain point of 630 to 655° C., and wherein an average cooling rate is 350° C./min or more.

3. The process for producing an alkali-free glass substrate according to claim 1, wherein a glass raw material is melted and formed to produce an alkali-free glass substrate having a strain point of 655 to 680° C., and wherein an average cooling rate is 300° C./min or more.

4. The process for producing an alkali-free glass substrate according to claim 1, wherein an alkali-free glass substrate having a liquidus viscosity of $10^{4.5}$ Pa·s or more is produced.

5. The process for producing an alkali-free glass substrate according to claim 1, wherein the substrate, after the cooling step, has an absolute value of thermal shrinkage of 53 ppm or more.

6. A process for producing an alkali-free glass substrate comprising melting a glass raw material and forming a glass sheet by an overflow down draw method, wherein, in a cooling step during said forming, an average sheet drawing rate in a temperature range from an annealing point to a temperature lowered by 100° C. from the annealing temperature is 150 cm/min or more and an average cooling rate in the temperature range from the annealing point to the temperature lowered by 100° C. from the annealing temperature is 300° C./min or more, wherein the produced alkali-free glass substrate comprises, by weight %, 50 to 70% of $SiO_2$, 1 to 20% of $Al_7O_3$, 0 to 15% of $B_2O_3$, 0 to 30% of MgO, 0 to 30% of CaO, 0 to 30% of SrO and 0 to 30% of BaO.

7. The process for producing an alkali-free glass substrate according to claim 6, wherein an alkali-free glass substrate having a liquidus viscosity of $10^{4.5}$ Pa·s or more is produced.

8. The process for producing an alkali-free glass substrate according to claim 6, wherein the substrate, after the cooling step, has an absolute value of thermal shrinkage of 53 ppm or more.

9. A process for producing an alkali-free glass substrate comprising melting a glass raw material and forming a glass sheet by an overflow down draw method, wherein, in a cooling step during said forming, an average cooling rate in a temperature range from an annealing point, which is greater than a strain point of the substrate, to a temperature lowered by 100° C. from the annealing temperature is 300° C./min or more, wherein the glass substrate has a variation of the thermal shrinkage when the cooling rate is varied by 60° C./min of 3 ppm or less, and, wherein the produced alkali-free glass substrate comprises, by weight %, 50 to 70% of $SiO_2$, 1 to 20% of $Al_2O_3$, 0 to 15% of $B_2O_3$, 0 to 30% of MgO, 0 to 30% of CaO, 0 to 30% of SrO and 0 to 30% of BaO.

10. The process for producing an alkali-free glass substrate according to claim 9, wherein an alkali-free glass substrate having a liquidus viscosity of $10^{4.5}$ Pa·s or more is produced.

11. The process for producing an alkali-free glass substrate according to claim 9, wherein the substrate, after the cooling step, has an absolute value of thermal shrinkage of 53 ppm or more.

\* \* \* \* \*